United States Patent
Chien (10) Patent No.: US 10,247,313 B2
(45) Date of Patent: Apr. 2, 2019

(54) SPRAY GUN AND ADJUSTMENT VALVE THEREOF

(71) Applicant: Tao-Pao Chien, New Taipei (TW)

(72) Inventor: Tao-Pao Chien, New Taipei (TW)

(*) Notice: Subject to any disclaimer, the term of this patent is extended or adjusted under 35 U.S.C. 154(b) by 0 days.

(21) Appl. No.: 15/637,204

(22) Filed: Jun. 29, 2017

(65) Prior Publication Data
US 2019/0003599 A1   Jan. 3, 2019

(51) Int. Cl.
| | |
|---|---|
| *B05B 1/00* | (2006.01) |
| *F16K 1/52* | (2006.01) |
| *F16K 29/02* | (2006.01) |
| *B05B 1/30* | (2006.01) |
| *B05B 9/03* | (2006.01) |
| *B65D 39/08* | (2006.01) |

(52) U.S. Cl.
CPC .............. *F16K 1/52* (2013.01); *B05B 1/3013* (2013.01); *F16K 29/02* (2013.01); *B05B 9/03* (2013.01); *B65D 39/08* (2013.01)

(58) Field of Classification Search
CPC ....... B05B 7/0838; B05B 7/12; B05B 7/1209; B05B 7/0815; F16K 5/04; F16K 5/0407; F16K 5/0414; F16K 11/085; F16K 11/0853; F16K 11/0856; F16K 11/20; F16K 11/202; F16K 11/22; F16K 11/12; Y10T 137/86849; Y10T 137/86831; Y10T 137/87096; Y10T 137/87587; Y10T 137/88022; Y10T 137/8803; Y10T 137/88038
USPC ...... 239/581.1, 581.2, 582.1, 563, 564, 561; 137/625.42, 625.46, 637, 614.16–614.18
See application file for complete search history.

(56) References Cited

U.S. PATENT DOCUMENTS

| | | | | |
|---|---|---|---|---|
| 682,453 | A * | 9/1901 | Bunting, Jr. ............. | E03C 1/23 137/637.2 |
| 1,496,584 | A * | 6/1924 | McCrink ................. | F16K 11/12 137/555 |
| 1,592,209 | A * | 7/1926 | Heine .................. | B05B 1/1636 239/563 |
| 1,597,523 | A * | 8/1926 | Grund .................. | F16K 11/083 137/625.16 |
| 1,929,348 | A * | 10/1933 | Cathcart ................ | B05B 15/55 239/110 |

(Continued)

FOREIGN PATENT DOCUMENTS

| | | |
|---|---|---|
| GB | 518406 A | 2/1940 |
| JP | 2008161789 A | 7/2008 |

OTHER PUBLICATIONS

Search Report in Counterpart Foreign Patent Application.

*Primary Examiner* — Viet Le
(74) *Attorney, Agent, or Firm* — Rosenberg, Klein & Lee (57) ABSTRACT

A spray gun includes a spray gun main body and an adjustment valve. The spray gun main body has an air intake passage, a first air outlet passage, a second air outlet passage, and a mounting hole defined therein. The mounting hole is in communication with the air intake passage, the first air outlet passage and the second air outlet passage. The adjustment valve is mounted to the spray gun main body and located in the mounting hole. The adjustment valve includes a first operating member and a second operating member. The second operating member is movably mounted on the first operating member.

10 Claims, 8 Drawing Sheets

(56) References Cited

U.S. PATENT DOCUMENTS

| | | | | |
|---|---|---|---|---|
| 2,399,460 A * | 4/1946 | Britton | F16K 11/22 | 137/555 |
| 2,501,657 A * | 3/1950 | Barkelew | F16K 11/202 | 137/270 |
| 2,563,154 A * | 8/1951 | Brown, Jr. | F16K 11/202 | 137/556.6 |
| 2,563,955 A * | 8/1951 | Pearse | F16K 11/202 | 137/597 |
| 2,614,851 A * | 10/1952 | Parker | F16K 11/202 | 137/607 |
| 2,633,872 A * | 4/1953 | Hennessey | F16K 11/202 | 137/606 |
| 2,644,483 A * | 7/1953 | Parker | F16K 11/202 | 137/605 |
| 2,713,344 A * | 7/1955 | Gallistel | A01J 7/02 | 134/167 C |
| 2,775,259 A * | 12/1956 | Stiebel | F16K 11/20 | 137/599.12 |
| 2,999,647 A * | 9/1961 | Sosnick | B05B 1/12 | 239/400 |
| 3,026,905 A * | 3/1962 | Nilsson | F16K 11/22 | 137/596 |
| 3,099,996 A * | 8/1963 | Symmons | F16K 11/202 | 137/100 |
| 3,106,937 A * | 10/1963 | Sands | F16K 17/168 | 137/461 |
| 3,112,883 A * | 12/1963 | Blanchard | B05B 1/12 | 239/276 |
| 3,128,787 A * | 4/1964 | Knight | B05B 12/1409 | 137/594 |
| 3,136,339 A * | 6/1964 | Champion | F16K 11/202 | 137/625.41 |
| 3,169,707 A * | 2/1965 | Williams | B01J 3/02 | 134/167 R |
| 3,233,865 A * | 2/1966 | Panzica | F16K 5/04 | 137/625.47 |
| 3,393,706 A * | 7/1968 | Burhop | F16K 11/20 | 137/605 |
| 3,411,541 A * | 11/1968 | Hindman | F16K 11/202 | 137/360 |
| 3,460,565 A * | 8/1969 | Sanderson | F16K 11/202 | 137/555 |
| 3,511,279 A * | 5/1970 | Hancock | F16K 11/202 | 137/606 |
| 3,584,654 A * | 6/1971 | Deloye | F16K 11/10 | 137/606 |
| 4,146,055 A * | 3/1979 | Ryder | F16K 11/085 | 137/625.41 |
| 4,177,947 A * | 12/1979 | Menzel | B05B 1/3026 | 138/45 |
| 4,264,039 A * | 4/1981 | Moreland | A61H 33/027 | 137/888 |
| 4,320,541 A * | 3/1982 | Neenan | A61H 33/027 | 137/888 |
| 4,627,624 A * | 12/1986 | Usui | F16J 15/3496 | 137/625.46 |
| 4,681,140 A * | 7/1987 | Hayman | F16K 11/074 | 137/597 |
| 4,901,750 A * | 2/1990 | Nicklas | F16K 11/0746 | 137/270 |
| 4,952,132 A * | 8/1990 | Lundquist | B29B 13/10 | 210/390 |
| 4,981,156 A * | 1/1991 | Nicklas | F16K 11/0746 | 137/270 |
| 5,234,193 A * | 8/1993 | Neal, Jr. | F16K 27/065 | 251/175 |
| 5,303,868 A * | 4/1994 | Kroll | B05B 1/1654 | 239/394 |
| 5,556,007 A * | 9/1996 | Breitsprecher | B01F 15/0466 | 222/136 |
| 5,655,608 A * | 8/1997 | Sundholm | A62C 31/05 | 169/20 |
| 6,659,373 B1 * | 12/2003 | Heren | B05B 1/3013 | 239/391 |
| 7,025,291 B2 * | 4/2006 | Wu | B05B 1/3013 | 239/525 |
| 7,097,118 B1 * | 8/2006 | Huang | B05B 1/3013 | 239/290 |
| 7,328,860 B1 * | 2/2008 | Chen | B05B 1/3026 | 137/625.31 |
| 7,341,239 B2 * | 3/2008 | Hodel | F16K 31/52416 | 137/872 |
| 7,487,797 B2 * | 2/2009 | Di Nunzio | F16K 11/0787 | 137/625.17 |
| 7,802,733 B2 * | 9/2010 | Schmitt | G05D 23/1393 | 137/597 |
| 7,909,062 B2 * | 3/2011 | Chen | E03C 1/04 | 137/801 |
| 7,909,269 B2 * | 3/2011 | Erickson | B05B 1/1618 | 137/801 |
| 8,042,402 B2 * | 10/2011 | Brown | G01L 19/0015 | 73/756 |
| 8,070,076 B2 * | 12/2011 | Erickson | E03C 1/0404 | 239/279 |
| 8,448,667 B2 * | 5/2013 | Meehan | E03C 1/0404 | 137/637.1 |
| 8,479,772 B2 * | 7/2013 | Petrovic | B05B 1/1609 | 137/625.48 |
| D690,799 S * | 10/2013 | Maier | D23/226 | |
| 8,631,823 B2 * | 1/2014 | Heerklotz | F16K 11/0655 | 137/625.4 |
| 8,950,693 B2 * | 2/2015 | Hsieh | B05B 1/3026 | 239/525 |
| 9,145,255 B2 * | 9/2015 | Zagorsky | B65D 83/666 | |
| 9,387,495 B2 * | 7/2016 | Schumacher | B05B 1/30 | |
| 9,416,884 B2 * | 8/2016 | Niver | F16K 11/20 | |
| 9,533,317 B2 * | 1/2017 | Gehrung | B05B 7/0815 | |
| 9,707,572 B2 * | 7/2017 | Erickson | B05B 1/1618 | |
| 9,861,992 B1 * | 1/2018 | Chen | B05B 1/3026 | |
| 9,895,702 B2 * | 2/2018 | Lei | B05B 1/12 | |
| 2002/0148501 A1 * | 10/2002 | Shieh | E03C 1/041 | 137/119.04 |
| 2003/0136450 A1 * | 7/2003 | Su | F16K 11/076 | 137/625.46 |
| 2004/0154671 A1 * | 8/2004 | Martins | B60H 1/00485 | 137/625.47 |
| 2005/0076960 A1 * | 4/2005 | Luig | F16K 11/202 | 137/606 |
| 2005/0178854 A1 * | 8/2005 | Dodd | B05B 7/1209 | 239/310 |
| 2006/0096644 A1 * | 5/2006 | Goldfarb | F16K 11/085 | 137/625.47 |
| 2006/0266851 A1 * | 11/2006 | Wang | B05B 1/3013 | 239/526 |
| 2007/0102540 A1 * | 5/2007 | MacLean-Blevins | B05B 7/12 | 239/310 |
| 2007/0144953 A1 * | 6/2007 | Rivi | F16K 11/085 | 210/130 |
| 2007/0193640 A1 * | 8/2007 | Malek | B05B 1/1618 | 137/801 |
| 2008/0041471 A1 * | 2/2008 | Paterson | F16K 5/0407 | 137/625.47 |
| 2008/0067264 A1 * | 3/2008 | Erickson | B05B 1/1618 | 239/445 |
| 2008/0105764 A1 * | 5/2008 | Jianglin | B05B 1/1618 | 239/526 |
| 2008/0245897 A1 * | 10/2008 | Nobili | E03C 1/0409 | 239/407 |
| 2008/0272213 A1 * | 11/2008 | Ting | B05B 7/0815 | 239/461 |
| 2009/0045623 A1 * | 2/2009 | Schmon | B05B 7/2408 | 285/334 |
| 2010/0176219 A1 * | 7/2010 | Hasegawa | B05B 3/00 | 239/407 |
| 2010/0270390 A1 * | 10/2010 | Reitz | B05B 7/0815 | 239/8 |
| 2010/0305508 A1 * | 12/2010 | Franks | A61M 5/14216 | 604/152 |

(56) References Cited

U.S. PATENT DOCUMENTS

| | | | |
|---|---|---|---|
| 2011/0137268 A1 | 6/2011 | Thomason et al. | |
| 2012/0012671 A1* | 1/2012 | Brose | B05B 7/12 |
| | | | 239/71 |
| 2012/0097762 A1* | 4/2012 | Gehrung | B05B 7/0815 |
| | | | 239/291 |
| 2013/0193237 A1* | 8/2013 | Erickson | E03C 1/084 |
| | | | 239/548 |
| 2014/0116550 A1* | 5/2014 | Hu | F16K 11/076 |
| | | | 137/625.46 |
| 2015/0367358 A1* | 12/2015 | Funseth | A01G 25/16 |
| | | | 239/159 |
| 2016/0074892 A1* | 3/2016 | Reimert | B05B 12/1481 |
| | | | 239/112 |
| 2016/0102614 A1* | 4/2016 | Williams | F16K 31/0606 |
| | | | 137/625.46 |
| 2016/0136659 A1* | 5/2016 | Erickson | B05B 1/1618 |
| | | | 239/443 |
| 2017/0211711 A1* | 7/2017 | Ritter | F16K 11/22 |
| 2017/0350519 A1* | 12/2017 | Cutler | F16K 11/22 |
| 2018/0045322 A1* | 2/2018 | Dalessio | F16K 5/0407 |

\* cited by examiner

SPRAY GUN AND ADJUSTMENT VALVE THEREOF

FIELD OF THE INVENTION

The present invention relates to a spray gun and an adjustment valve thereof, and more particularly to an adjustment valve having a plurality of operating members.

BACKGROUND OF THE INVENTION

The function of a paint spray gun is mainly to use compressed air for spraying paints on an article to be painted. In order to allow paint spray guns to meet various needs (such as, metal, wooden or plastic products to be painted, paints of different natures, finishing painting, preliminary painting, etc.), most paint spray guns are provided with a plurality of adjustment assemblies so that the users can make an adjustment according to their own needs. For example, the intake of the compressed air and the area or shape of painting can be adjusted.

The detail structures of paint spray guns have been disclosed, such as, US 2013/0320110 A1 titled "spray gun and accessories", EP0706832B1 titled "air operated paint spray gun", US 20120097762 A1 titled "paint spray gun", and so on. In these structures, a body portion of a spray gun main body is provided with an adjustment assembly in the form of a knob close to a grip portion, which facilitates the user to make an adjustment with the thumb when holding the spray gun. In addition, a rear end of the body portion of the spray gun main body is provided with another adjustment assembly for the user to operate other adjustment functions.

However, the adjustment functions of these adjustment assemblies are single and limited. In general, it is necessary to use another hand for auxiliary operations to meet the needs of making an adjustment. It is inconvenient for operation and use. Accordingly, the inventor of the present invention has devoted himself based on his many years of practical experiences to solve these problems.

SUMMARY OF THE INVENTION

The primary object of the present invention is to provide a spray gun and an adjustment valve thereof to enhance the convenience of operating the spray gun.

According to one aspect of the present invention, a spray gun is provided. The spry gun comprises a spray gun main body and an adjustment valve. The spray gun main body has an air intake passage, a first air outlet passage, a second air outlet passage, and a mounting hole defined therein. The mounting hole is in communication with the air intake passage, the first air outlet passage, and the second air outlet passage. The adjustment valve is mounted to the spray gun main body and located in the mounting hole. The adjustment valve includes a first operating member and a second operating member. The first operating member is movable relative to the spray gun main body for adjusting an outflow passing through the air intake passage and the first air outlet passage. The second operating member is movably mounted on the first operating member and corresponds to the second air outlet passage for adjusting an outflow passing through the second air outlet passage.

Preferably, the adjustment valve further comprises a valve seat. The valve seat has a pivot trough defined therein. The first operating member comprises a cylinder. The cylinder is pivotally connected to the pivot trough of the valve seat.

Preferably, the valve seat has a first opening and a second opening which are in communication with the pivot trough. The first opening and the second opening are in communication with the air intake passage and the first air outlet passage, respectively. The cylinder of the first operating member has at least one perforation. The perforation is staggered or communicated with the first the first opening or the second opening by turning the cylinder.

Preferably, the cylinder has a through hole defined therein. The second operating member is movably inserted in the through hole so that the second operating member can be displaced from a closed position to close the second air outlet passage to an open position to open the second air outlet passage.

Preferably, the valve seat has a screw hole. The screw hole is in communication with the pivot trough. The second operating member is screwed to the screw hole.

Preferably, the first operating member includes an operating portion. The second operating member includes an operating end. The operating portion and the operating end are located at a same side and adjacent to each other.

Preferably, the operating end has a smooth surface adjacent to the operating portion. The operating portion is slidably fitted on the smooth surface.

Preferably, the mounting hole is formed with a valve hole adjacent to the second air outlet passage. The second operating member includes an engaging end opposite the operating end. The engaging end is configured to close or open the valve hole. The engaging end has a guide bevel. The guide bevel has an angle of 77° to 79°.

Preferably, the spray gun main body comprises a grip portion, a spray head, and a body portion. The air intake passage is located in the grip portion. The air intake passage extends along a longitudinal direction of the grip portion. The body portion is connected with the grip portion and the spray head. The first air outlet passage and the second air outlet passage are located at opposing two sides of the body portion. The mounting hole is located in the body portion adjacent to the grip portion. The spray head comprises a first nozzle and a second nozzle. The first air outlet passage is in communication with the first nozzle. The second air outlet passage is in communication with the second nozzle.

According to another aspect of the present invention, an adjustment valve is provided. The adjustment valve comprises a valve seat, a first operating member, and a second operating member. The valve seat has a pivot trough defined therein. The valve seat further has a first opening, a second opening, and a screw hole which are in communication with the pivot trough. The first operating member is pivotally connected to the pivot trough of the valve seat. The first operating member comprises a cylinder extending along an axial direction. The cylinder has at least one perforation in a radial direction. The perforation is staggered or communicated with the first the first opening and/or the second opening by turning the first operating member. The cylinder has a through hole defined therein and extending along the axial direction. The second operating member is screwed to the screw hole and inserted in the through hole. The second operating member is displaced along the axial direction when rotated.

According to the above technical features, the present invention can achieve the following effects:

1. A single adjustment valve may have a plurality of adjustment functions for the user to switch and adjust conveniently, enhancing the convenience of operation.

2. The first operating member includes the rotatable cylinder, which is simple in structure and easy to assemble and manufacture.

3. The second operating member is inserted in the first operating member, so that the overall structure is compact and it is easy to switch between different operating modes.

4. The second operating member is screwed in or out by means of threads, so its operation is stable and reliable.

5. The first operating portion of the first operating member and the operating end of the second operating member are located at the same side and are adjacent to each other so that the user can perform a fine adjustment with the thumb of one hand to enhance the convenience of operation and switch.

6. The operating portion of the first operating member is slidably fitted on the smooth surface of the operating end of the second operating member to reduce the resistance for the operation of the first operating member.

7. The engaging end of the second operating member may have the guide bevel, and the angle of the guide bevel is between 77° to 79° to improve the flowability of the compressed air and thereby enhance the spraying effect.

8. The adjustment valve is not limited to the application of paint spray guns, for example, it can be applied to other types of guns or other fluid control devices.

DETAILED DESCRIPTION OF THE PREFERRED EMBODIMENTS

Embodiments of the present invention will now be described, by way of example only, with reference to the accompanying drawings.

Figure 1:
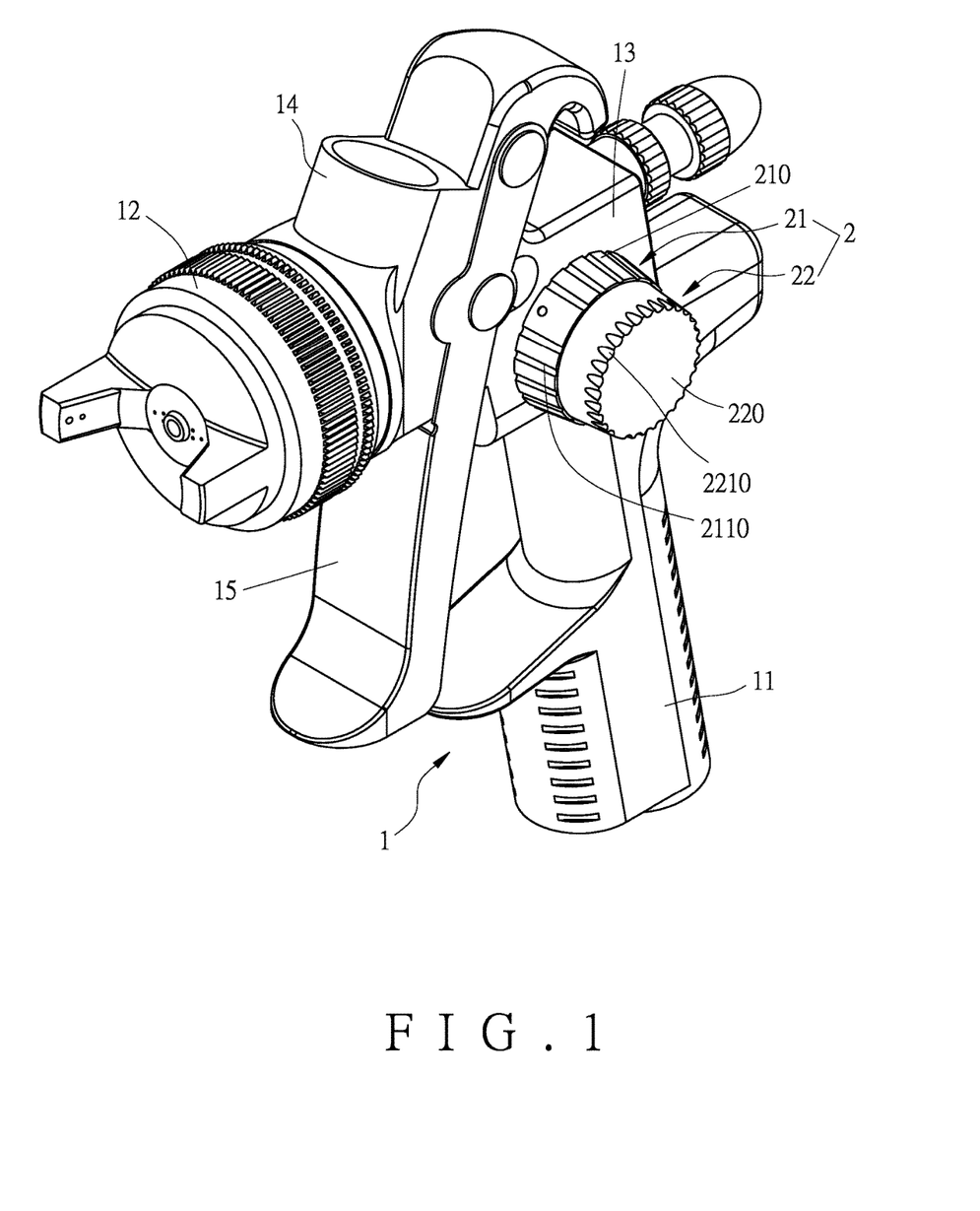
FIG. 1 is a perspective view in accordance with a preferred embodiment of the present invention.

As shown in FIG. 1, a spray gun according to a preferred embodiment of the present invention comprises a spray gun main body (1) and an adjustment valve (2) mounted to the spray gun main body (1). The spray gun main body (1) comprises a grip portion (11), a spray head (12), and a body portion (13) connected with the grip portion (11) and the spray head (12). The adjustment valve (2) is located at the body portion (13) close to the grip portion (11). It is convenient for the user to operate the spray gun with the thumb.

Referring to FIG. 1 again, in this embodiment, the spray gun main body (1) is mainly applied to spray paint, so the spray gun main body (1) may further comprise a paint supply portion (14). The paint supply portion (14) is configured to connect a paint can, as an example. When a trigger (15) of the spray gun main body (1) is pressed to a predetermined position, the spray head (12) sprays paint accompanied with the compressed air. The mechanism is that the trigger (15) drives a valve member (such as, a valve needle) to move for spraying paint. This mechanism is the common knowledge in this field. For the sake of simplicity, the details of this mechanism will not be described hereinafter. It is to be noted that the spray gun main body (1), in addition to the paint spraying, may be operated by slightly pressing the trigger (15) to spray the compressed air for removing dust and other debris on the surface of an article.

Figure 2:
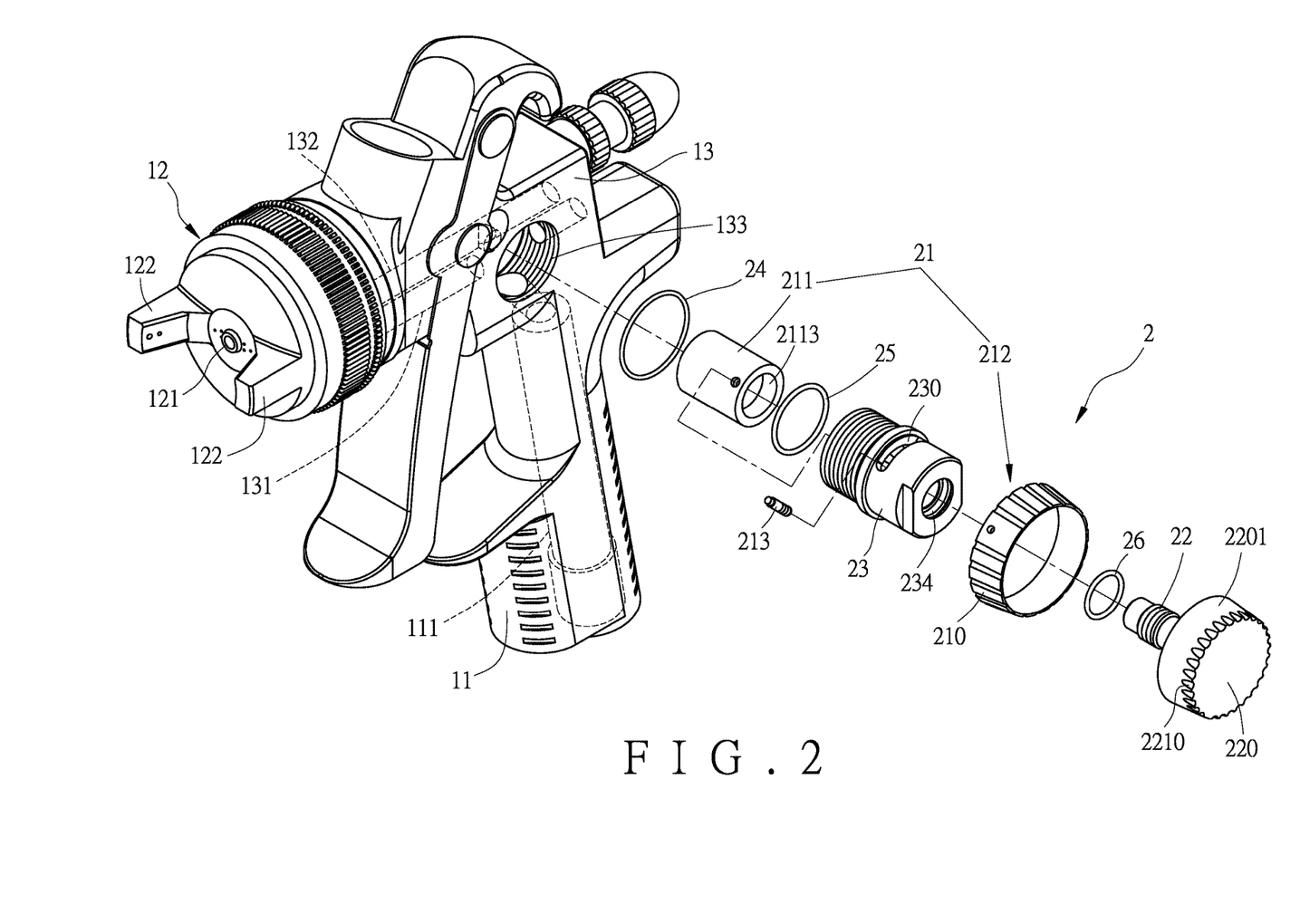
FIG. 2 is an exploded view in accordance with the preferred embodiment of the present invention.

Referring to FIG. 2, more specifically, the grip portion (11) has an air intake passage (111) extending in a longitudinal direction of the grip portion (11) for introducing an external fluid (such as, a high-pressure air). The spray head (12) may be used for spraying paints of different patterns. For example, the spray head (12) may comprise a first nozzle (121) and a plurality of second nozzles (122). In this embodiment, the first nozzle (121) is located at the center of the spray head (12) and has a circular hole for supplying a circular area of painting. The second nozzle (122) is located on the periphery of the first nozzle (121) for spray paints laterally, which may be combined with the aforesaid circular area of painting to form a strip-like area of painting. The paint patterns and the position relationship are merely illustrative and are not limited thereto. The inside of the spray head (12) has a distributary mechanism for communicating the first nozzle (121) and the second nozzles (122). This is the common knowledge in this field. For the sake of simplicity, the details of the distributary mechanism will not be described hereinafter.

Figure 3:
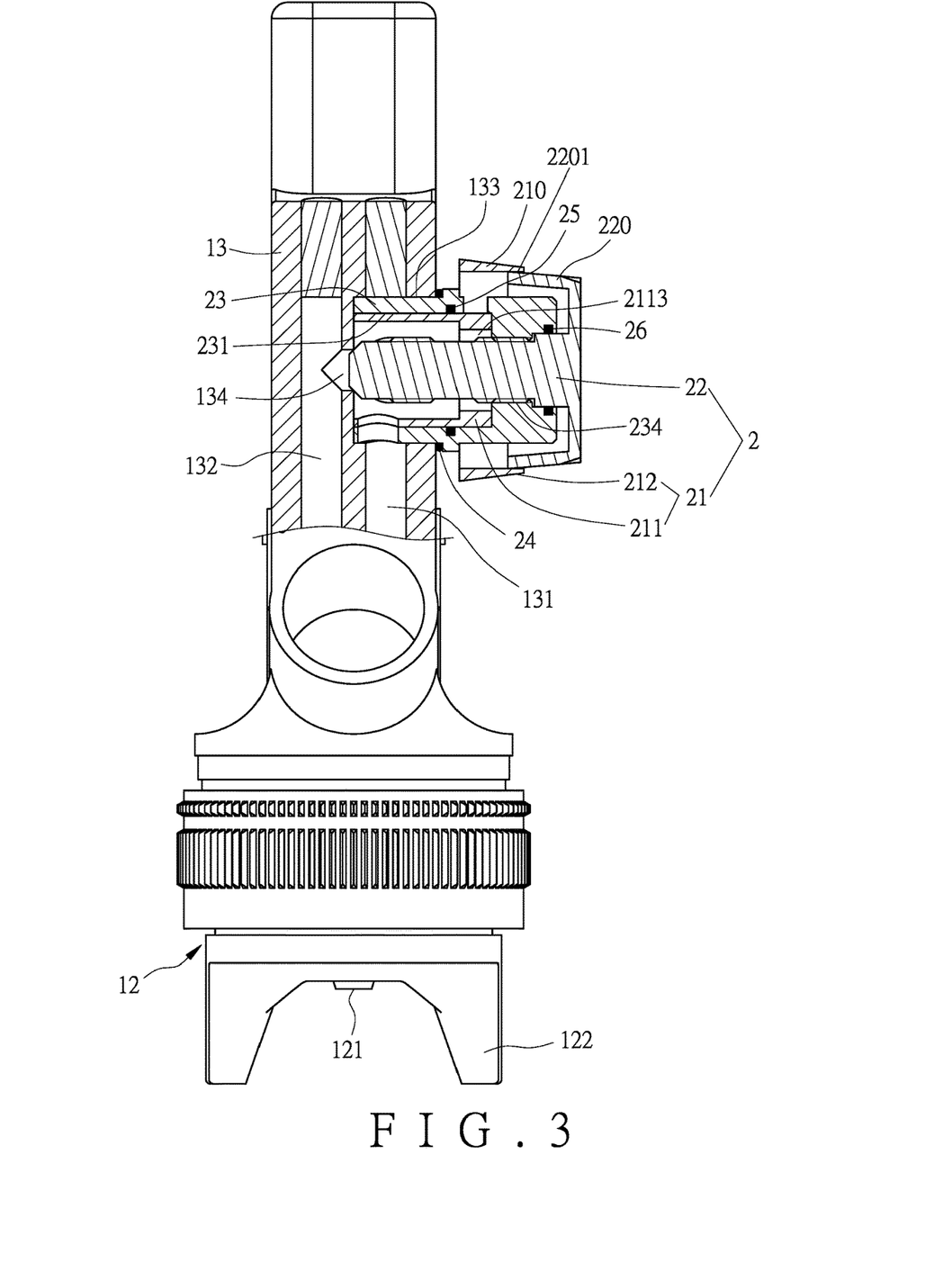
FIG. 3 is a first top and sectional view in accordance with the preferred embodiment of the present invention.

Referring to FIG. 2 and FIG. 3, the body portion (13) is connected with the grip portion (11) and the spray head (12). The body portion (13) has a first air outlet passage (131), a second air outlet passage (132), and a mounting hole (133) therein. The first air outlet passage (131) and the second air outlet passage (132) are located at opposing two sides of the body portion (13). The mounting hole (133) is located in the body portion (13) adjacent to the grip portion (11). The mounting hole (133) is in communication with the first air outlet passage (131), the second air outlet passage (132), and the air intake passage (111). The first air outlet passage (131) is in communication with the first nozzle (121). The second air outlet passage (132) is in communication with the second nozzles (122).

Referring to FIG. 1 and FIG. 3, more specifically, the adjustment valve (2) includes a first operating member (21) and a second operating member (22). The first operating member (21) includes an operating portion (210). The second operating member (22) includes an operating end (220). The operating portion (210) and the operating end (220) are adjacent to each other and are located at the same side for facilitating the user to perform a fine adjustment with the thumb. In this embodiment, the operating portion (210) is a ring and surrounds the operating end (220). The operating portion (210) and the operating end (220) are provided with a plurality of anti-slip ripples (2110), (2210).

Preferably, the operating end (220) has a smooth surface (2201) adjacent to the operating portion (210). The operating portion (210) is slidably fitted on the smooth surface (2201), thereby reducing the frictional resistance when the operation portion (210) is displaced.

Referring to FIG. 2 and FIG. 3, more specifically, in this embodiment, the adjustment valve (2) further comprises a valve seat (23). The valve seat (23) is screwedly mounted to the mounting hole (133). For example, the first operating member (21) and the second operating member (22) are mounted to the spray gun main body (1) through the valve seat (23). In particular, the first operating member (21) comprises a cylinder (211) and an actuating member (212). The actuating member (212) and the cylinder (211) are connected together through a connecting member (212). The connecting member (213) is inserted through the valve seat (23). Two ends of the connecting member (213) are fixedly connected to the actuating member (212) and the cylinder (211) by screwing, fitting, binding, respectively. The actuating member (212) includes the operating portion (210) for the user to pull the actuating member (212) to link the cylinder (211). The valve seat (23) has a pivot trough (231) defined therein. The cylinder (211) is pivotally connected in the pivot trough (231). Preferably, the valve seat (23) has a limit slot (230) formed thereon. The connecting member (213) is located in the limit slot (230). The limit slot (230) is configured to limit the displacement stroke of the connecting member (213).

Figure 4:
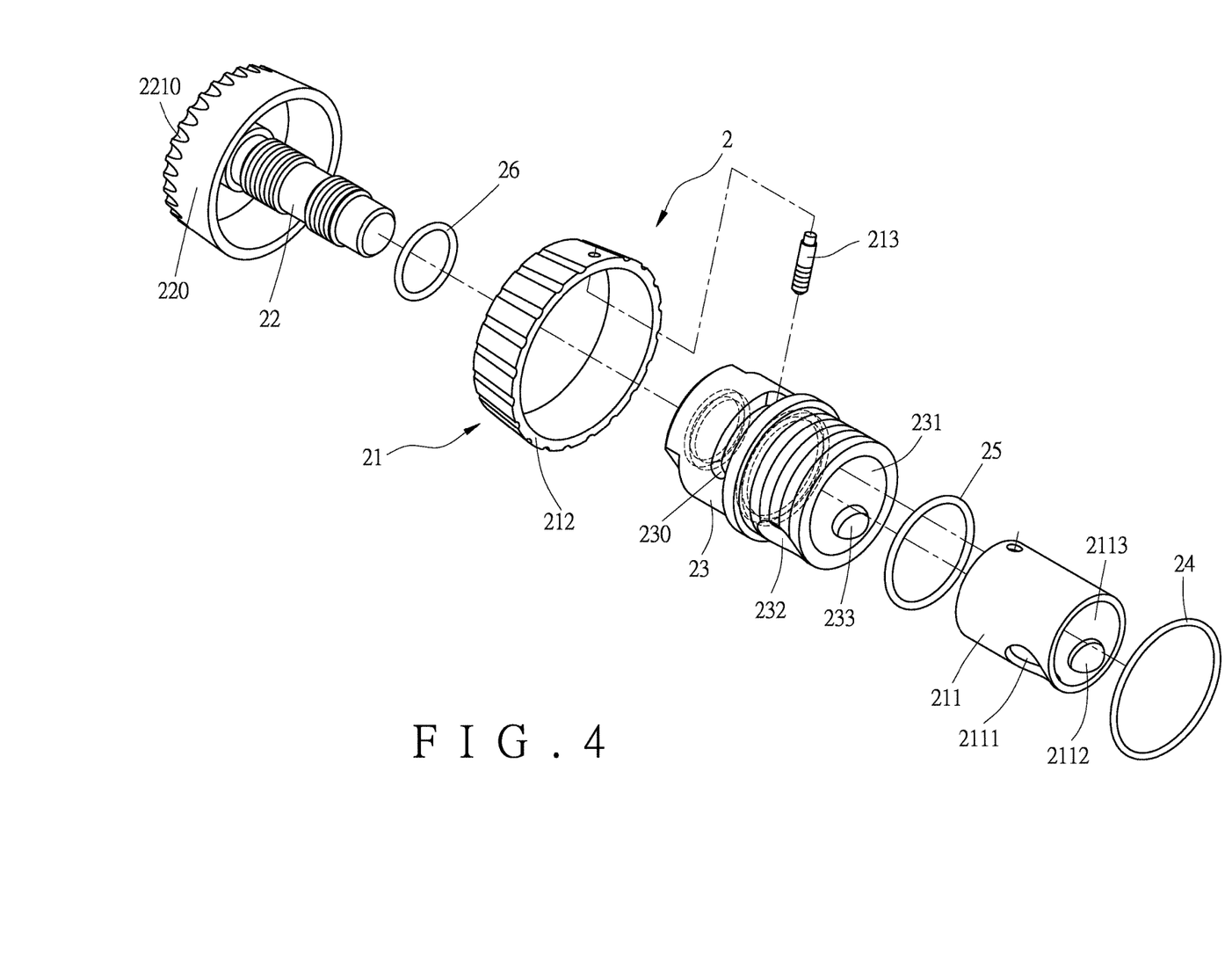
FIG. 4 is an exploded view of the adjustment valve in accordance with the preferred embodiment of the present invention.
Figure 5:
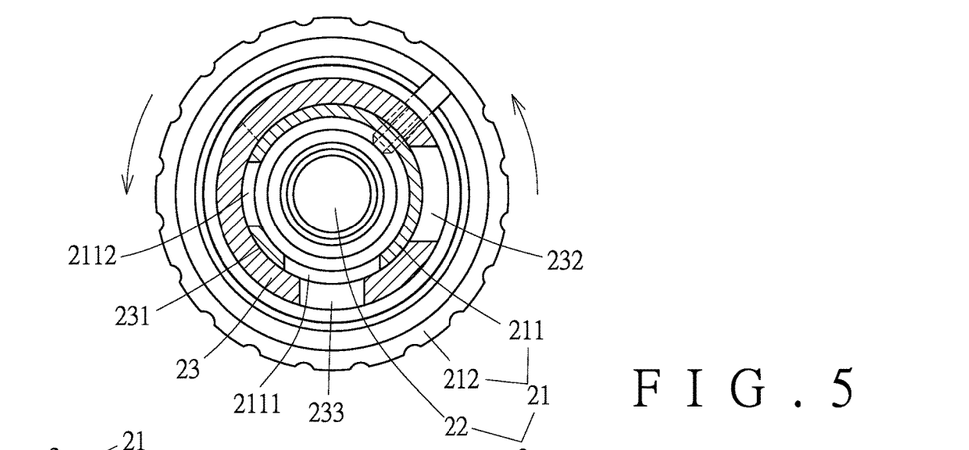
FIG. 5 is a first sectional view showing the operation of the adjustment valve in accordance with the preferred embodiment of the present invention.
Figure 6:
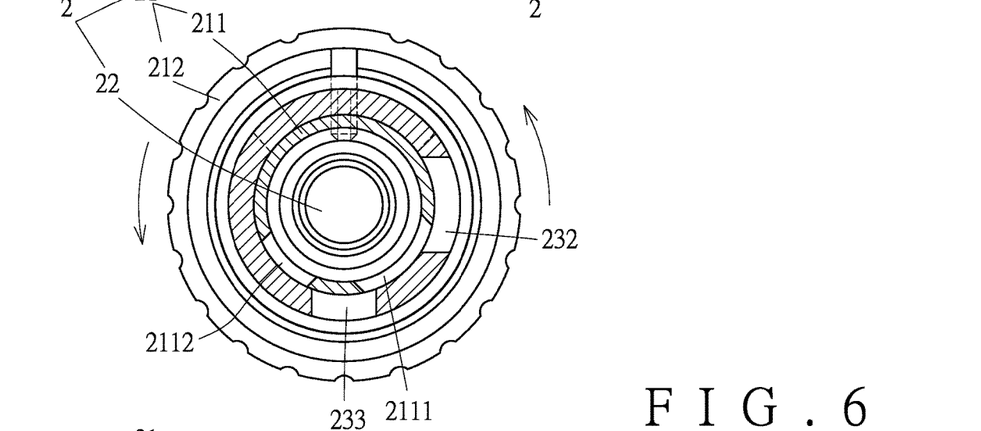
FIG. 6 is a second sectional view showing the operation of the adjustment valve in accordance with the preferred embodiment of the present invention.
Figure 7:
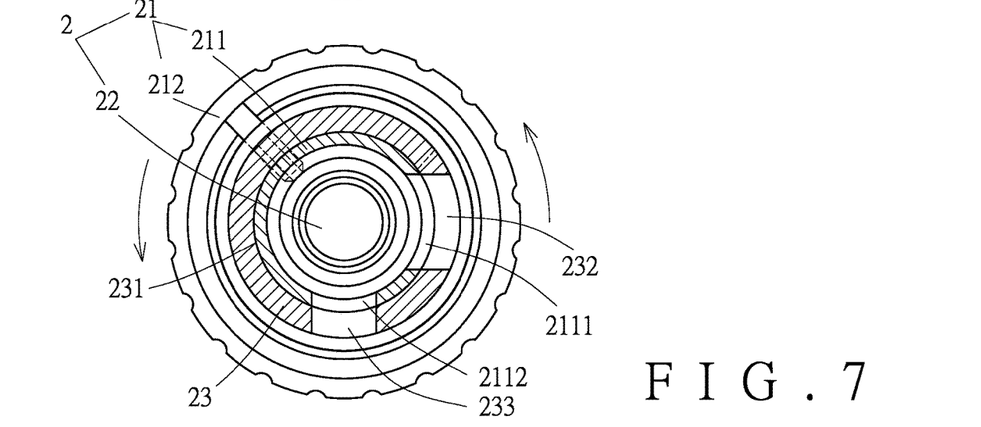
FIG. 7 is a third sectional view showing the operation of the adjustment valve in accordance with the preferred embodiment of the present invention.

Referring to FIG. 2 and FIG. 4, more specifically, the cylinder (211) extends along an axial direction. The cylinder (211) has at least one perforation (2111), (2112) formed in a radial direction thereof and a through hole (2113) formed in the axial direction. In this embodiment, the cylinder (211) has a first perforation (2111) and a second perforation (2112) formed thereon. The valve seat (23) has a first opening (232) and a second opening (233) which are in communication with the pivot trough (231). In this embodiment, the first opening (232) and the first perforation (2111) each have a first diameter. The second opening (233) and the second perforation (2112) each have a second diameter. The first diameter is greater than the second diameter, thereby providing a sufficient adjustment stroke in a limited size of the cylinder (211). Referring to FIG. 5 to FIG. 7, when the cylinder (211) is turned, the first perforation (2111) and the second perforation (2112) may be staggered, partially communicated with, or fully communicated with the first opening (232) and the second opening (233) during turning.

Referring to FIG. 2 and FIG. 3, the second operating member (22) is movably inserted in the through hole (2113) of the cylinder (211). Specifically, the valve seat (23) has a screw hole (234) communicating with the pivot trough (231). The second operating member (22) is screwed to the screw hole (234). It is to be noted that the adjustment valve (2) may cooperate with a sealing member for providing a sealing effect. For example, the adjustment valve (2) may further comprise a first sealing ring (24), a second sealing ring (25) and a third sealing ring (26). The first sealing ring (24) is fitted on the outer periphery of the valve seat (23). The second sealing ring (25) is located between the valve seat (23) and the first operating member (21). The third sealing ring (26) is located between the valve seat (23) and the second operating member (22).

Figure 8:
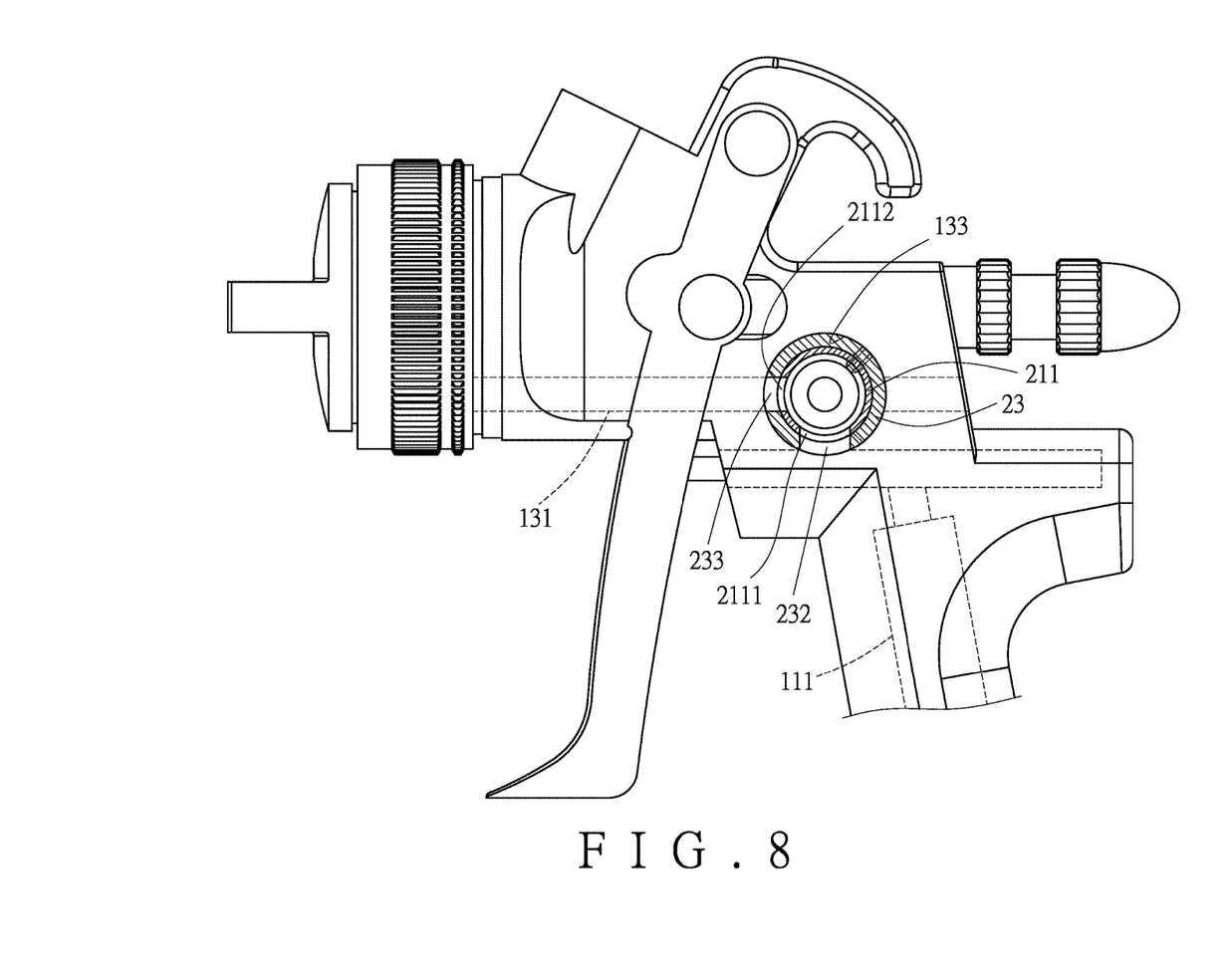
FIG. 8 is a first sectional view showing the adjustment valve corresponding to the air intake passage and the first air outlet passage in accordance with the preferred embodiment of the present invention.
Figure 9:
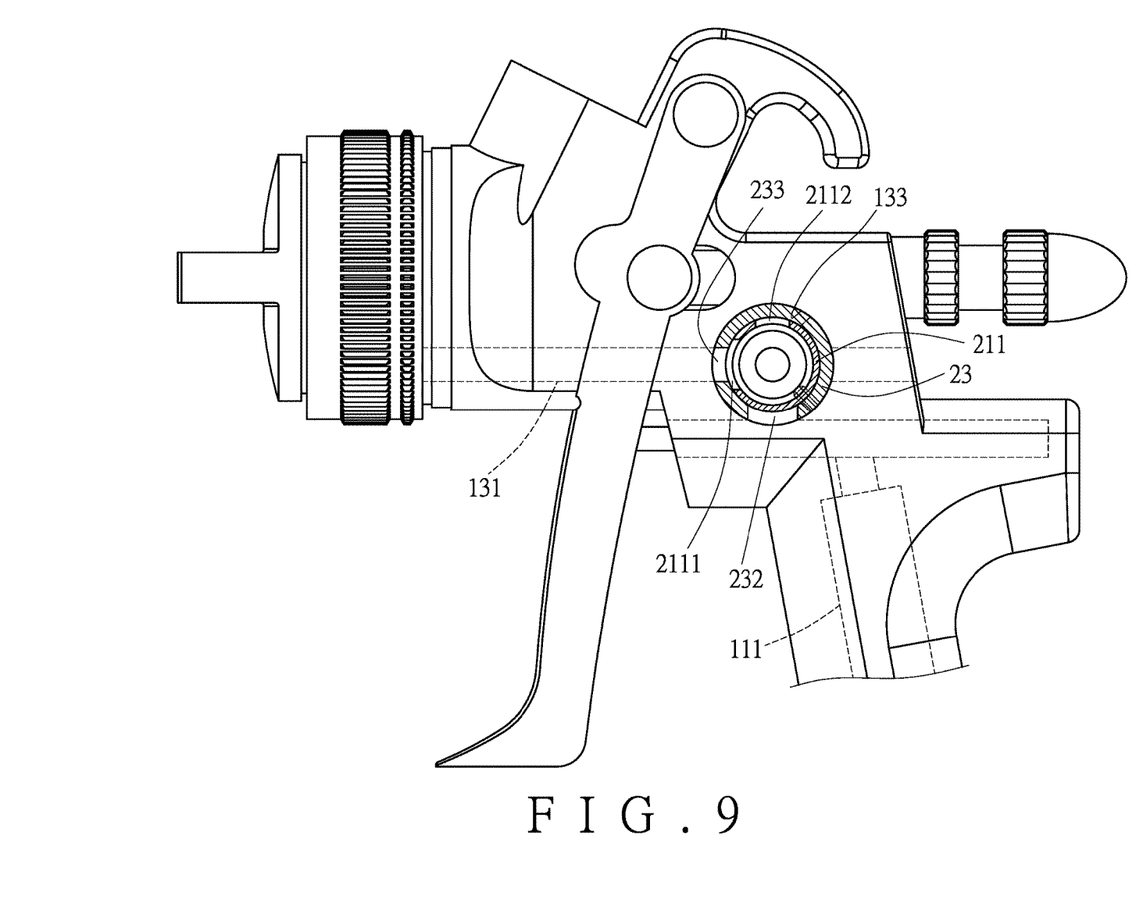
FIG. 9 is a second sectional view showing the adjustment valve corresponding to the air intake passage and the first air outlet passage in accordance with the preferred embodiment of the present invention.

Referring to FIG. 8 and FIG. 9, when the valve seat (23) is mounted to the mounting hole (133), the first opening (232) and the second opening (233) of the valve seat (23) are in communication with the air intake passage (111) and the first air outlet passage (131), respectively. When the cylinder (211) is turned, the outflow passing through the air intake passage (111) and the first air outlet passage (131) can be adjusted through the first perforation (2111) and the second perforation (2112) of the cylinder (211). Detailed operations can be read in conjunction with FIG. 5 to FIG. 7 and their corresponding descriptions, and will not be repeated here. In this embodiment, since the diameter of the first perforation (2111) is greater, the outflow passing through the air intake passage (111) and the first air outlet passage (131) can be controlled together, but not limited thereto. For example, the diameter of the second perforation (2112) may be changed for communicating the second perforation (2112) with the second opening (233) constantly, such that the adjustment can be achieved through the first perforation (2111) only.

Figure 10:
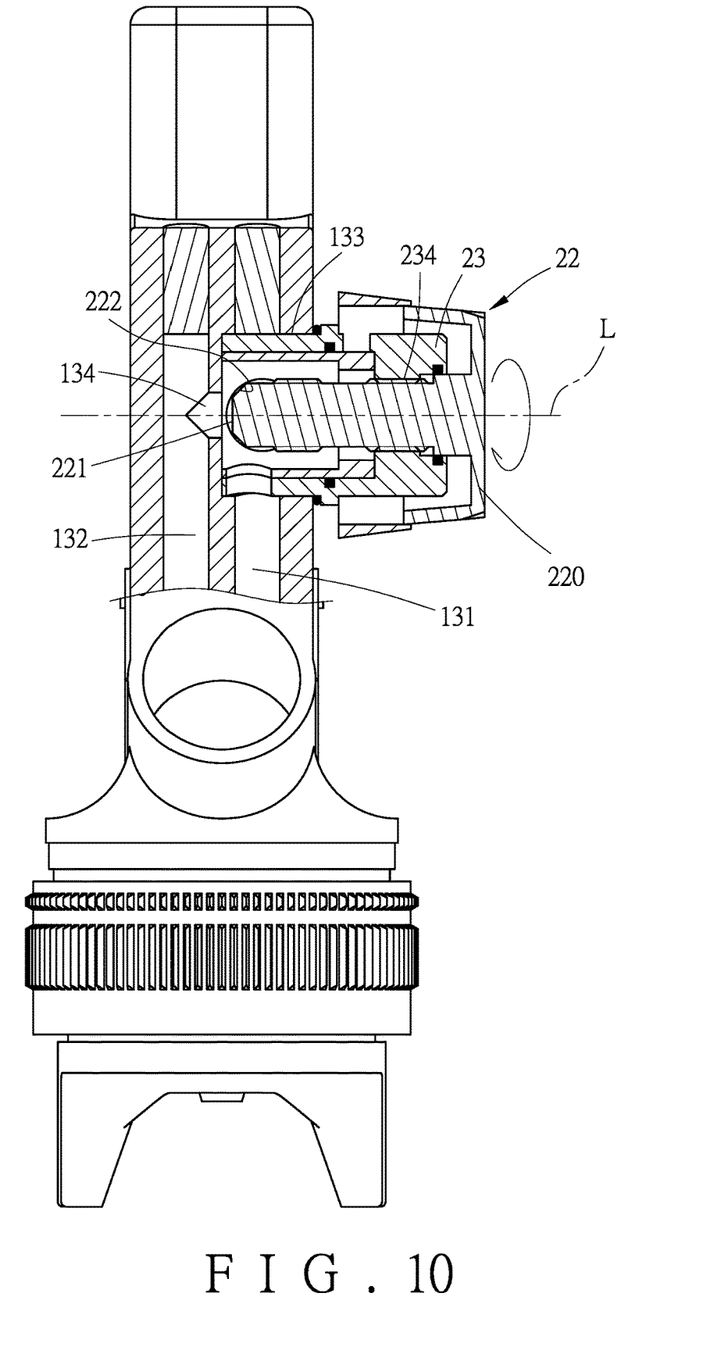
FIG. 10 is a second top and sectional view in accordance with the preferred embodiment of the present invention.

Referring to FIG. 10 and FIG. 3, the mounting hole (133) is formed with a valve hole (134) adjacent to the second air outlet passage (132). The second operating member (22) includes an engaging end (221) opposite the operating end (220) for closing or opening the valve hole (134). When the second operating member (22) is rotated, the second operating member (22) is displaced along an axial direction (L) through the screw hole (234) of the valve seat (23), such that the second operating member (22) is displaced from a closed position to close the valve hole (134) to an open position to open the valve hole (134). The outflow passing through the second air outlet passage (132) is controlled by the magnitude of the displacement. Preferably, the engaging end (221) is formed with a guide bevel (222) having an angle of 77° to 79°. Preferably, the angle of the guide bevel (222) is 78°.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A spray gun, comprising:
    a spray gun main body, having an air intake passage, a first air outlet passage, a second air outlet passage, and a mounting hole defined therein, the mounting hole being in communication with the air intake passage, the first air outlet passage and the second air outlet passage; and
    an adjustment valve, mounted to the spray gun main body and located in the mounting hole, the adjustment valve including a first operating member and a second operating member, the first operating member being coupled to a cylinder that is movable relative to the spray gun main body for adjusting an outflow passing through the air intake passage and the first air outlet passage, the second operating member being movably mounted on the first operating member and having an engaging end disposed in correspondence with a valve hole in the second air outlet passage for adjusting an outflow passing through the second air outlet passage, the adjustment valve further including a valve seat, the valve seat having a pivot trough defined therein, and the cylinder being pivotally connected to the pivot trough of the valve seat.

2. The spray gun as claimed in claim 1, wherein the valve seat has a first opening and a second opening which are in communication with the pivot trough, the first opening and the second opening are in communication with the air intake passage and the first air outlet passage respectively, the cylinder of the first operating member has at least one perforation, and the perforation is staggered or communicated with the first the first opening or the second opening by turning the cylinder.

3. The spray gun as claimed in claim 2, wherein the cylinder has a through hole defined therein, the second operating member is movably inserted in the through hole so that the engaging end of the second operating member can be displaced from a closed position to close the second air outlet passage to an open position to open the second air outlet passage.

4. The spray gun as claimed in claim 3, wherein the valve seat has a screw hole, the screw hole is in communication with the pivot trough, and the second operating member is screwed to the screw hole.

5. The spray gun as claimed in claim 4, wherein the first operating member includes an operating portion, the second operating member includes an operating end, the operating portion and the operating end are located at a same side and adjacent to each other.

6. The spray gun as claimed in claim 5, wherein the operating end has a smooth surface adjacent to the operating portion, and the operating portion is slidably fitted on the smooth surface.

7. The spray gun as claimed in claim 5, wherein the valve hole is adjacent to the second air outlet passage, the engaging end is opposite the operating end, the engaging end has a guide bevel to close or open the valve hole, and the guide bevel has an angle of 77° to 79°.

8. The spray gun as claimed in claim 1, wherein the spray gun main body comprises a grip portion, a spray head, and a body portion, the air intake passage is located in the grip portion, the air intake passage extends along a longitudinal direction of the grip portion, the body portion is connected with the grip portion and the spray head, the first air outlet passage and the second air outlet passage are located at opposing two sides of the body portion, the mounting hole is located in the body portion adjacent to the grip portion, the spray head comprises a first nozzle and a second nozzle, the first air outlet passage is in communication with the first nozzle, and the second air outlet passage is in communication with the second nozzle.

9. An adjustment valve, comprising:
    a valve seat, having a pivot trough defined therein, the valve seat further having a first opening, a second opening and a screw hole which are in communication with the pivot trough;
    a first operating member, pivotally connected to the pivot trough of the valve seat, the first operating member comprising a cylinder extending along an axial direction, the cylinder having at least one perforation in a radial direction, and the perforation being staggered or communicated with the first the first opening and/or the second opening by turning the first operating member, the cylinder having a through hole defined therein and extending along the axial direction; and
    a second operating member, screwed to the screw hole and inserted in the through hole, the second operating member being displaced along the axial direction when rotated.

10. The adjustment valve as claimed in claim 9, wherein the first operating member includes an operating portion, the second operating member includes an operating end, the operating portion and the operating end are located at a same side and adjacent to each other.

\* \* \* \* \*